(12) United States Patent
Peterson et al.

(10) Patent No.: US 9,771,985 B2
(45) Date of Patent: Sep. 26, 2017

(54) BRACKET BARB PRESSURE PLATE STOP

(71) Applicant: Eaton Corporation, Cleveland, OH (US)

(72) Inventors: Steven Michael Peterson, LaOtto, IN (US); Troy Scott Reinoehl, Golden, CO (US); Clinton Lee McClellan, Fort Wayne, IN (US); James Lee Whitaker, Hicksville, OH (US)

(73) Assignee: Eaton Corporation, Cleveland, OH (US)

( * ) Notice: Subject to any disclaimer, the term of this patent is extended or adjusted under 35 U.S.C. 154(b) by 258 days.

(21) Appl. No.: 14/558,112

(22) Filed: Dec. 2, 2014

(65) Prior Publication Data

US 2015/0260234 A1  Sep. 17, 2015

Related U.S. Application Data

(60) Provisional application No. 61/953,095, filed on Mar. 14, 2014.

(51) Int. Cl.
*F16D 13/70* (2006.01)
*F16D 13/42* (2006.01)
*F16D 13/71* (2006.01)

(52) U.S. Cl.
CPC ............. *F16D 13/70* (2013.01); *F16D 13/42* (2013.01); *F16D 13/71* (2013.01); *F16D 2300/26* (2013.01)

(58) Field of Classification Search
CPC ............... F16D 2300/26; F16D 13/646; F16D 2013/706; F16D 13/757; F16D 13/70; F16D 13/71
See application file for complete search history.

(56) References Cited

U.S. PATENT DOCUMENTS 5,634,541 A * 6/1997 Maucher ............... F16D 13/585
192/111.3
5,964,429 A  10/1999 Burch et al.
(Continued)

FOREIGN PATENT DOCUMENTS

DE   10049475 A1 *  4/2002  ............ F16D 13/71

OTHER PUBLICATIONS

Machine translation of DE 10049475.*
Definition of "Barb," taken from www.merriamwebster.com on Feb. 7, 2017.*

*Primary Examiner* — Stacey Fluhart
(74) *Attorney, Agent, or Firm* — Ernest E. Helms

(57) ABSTRACT

A dry friction clutch for connecting a transmission with a flywheel of an engine is provided. The clutch includes a bracket having a main body axially spaced from an engine flywheel. The bracket is torsionally connected to the flywheel. The bracket has a generally U-shaped cross section with a main body connected with generally axially extending side walls. An axially movable pressure plate is torsionally connected with the bracket. The pressure plate is axially movable within the bracket. A friction disc is provided having a connection with an input shaft of a transmission. The friction disc is axially positioned between the flywheel and the pressure plate. A release assembly is provided including a spring for urging the pressure plate toward the flywheel. The bracket side walls have inward positioned barbs to axially limit travel of the pressure plate.

13 Claims, 10 Drawing Sheets

(56) References Cited

U.S. PATENT DOCUMENTS

| | | | | |
|---|---|---|---|---|
| 6,109,412 | A * | 8/2000 | Cole | F16D 13/757 |
| | | | | 192/111.3 |
| 6,296,099 | B1 | 10/2001 | Gochenour | |
| 9,371,866 | B2 * | 6/2016 | Raber | F16D 13/646 |
| 2012/0272503 | A1 * | 11/2012 | Szuba | F16D 13/646 |
| | | | | 29/428 |
| 2013/0020167 | A1 * | 1/2013 | Krebs | F16D 3/66 |
| | | | | 192/48.1 |

* cited by examiner

BRACKET BARB PRESSURE PLATE STOP

CROSS-REFERENCE TO RELATED APPLICATIONS

This application claims the benefit of U.S. Provisional Application No. 61/953,095, filed Mar. 14, 2014.

FIELD OF THE INVENTION

The present invention relates to dry friction clutches, especially dry friction clutches utilized for connecting an engine with a transmission of a vehicle.

BACKGROUND OF THE INVENTION

Dry friction clutches are often utilized to allow for selective engagement of an engine with an input shaft of a transmission. Many dry clutches have a bracket (sometimes referred to as a cover) that is spaced from and connected with an engine flywheel. Inside the bracket is a pressure plate that is torsionally connected to the bracket and is axially moveable towards the flywheel. Positioned between pressure plate and flywheel is a friction disc. The friction disc is torsionally connected with an input shaft of a transmission. To urge the pressure plate towards the flywheel to capture the friction disc with the flywheel, there is an apply spring or spring loaded lever. As the friction lining of the friction disc wears, adjustment is required. To provide for adjustment, many clutches have a multiple cam ring adjuster between the apply spring or lever and the pressure plate. Many of the adjuster arrangements have a first cam ring that is non-rotative that engages a second rotative ring. A torsional spring is provided to urge the second cam ring to rotate with respect to the first cam ring. As the second cam ring rotates, the distance between the apply spring or lever and an extreme end of the pressure plate increases to compensate for the friction plate wear.

Examples of dry friction clutches with cam ring adjustment mechanisms can be found by a review of U.S. Pat. Nos. 5,964,429 and 6,109,412 and 6,296,099. It is also desirable in dry friction clutches with adjustment mechanisms to limit the maximum amount of adjustment.

Although an adjustment mechanism is provided to prevent over-adjustment of the pressure plate, it is desirable to provide a hard fail-safe stop to prevent the pressure plate from axially coming too close to the flywheel. The bracket is U-shaped like a bowl with a central opening. The bowl shaped bracket has a main body or base that extends radially outward from the central opening. The bracket main body is axially spaced away from the engine flywheel. The bracket main body is joined with a generally axially extending tubular shaped side wall. An extreme end edge of the side wall fits into a circular rim of the flywheel. The fit of the bracket side wall into the pilot rim of the flywheel should be as snug as possible. Accordingly, the bracket side walls have an outer bevel to pilot the assembly of the bracket into the pilot rim of the engine flywheel. Proper concentric alignment of the bracket to the flywheel is important to ensure the clutch is centered to the flywheel and to reduce imbalance in applications that can cause excessive vehicle vibration. Proper concentric alignment also reduces wear of the clutch actuation components that can occur due to excessive relative movement from misalignment. Also, if interference between the bracket sidewall and the flywheel pilot rim occurs, results can be that the clutch will have an increased required force for installation potentially raising burrs in the clutch OD from the flywheel pilot rim. The burrs can make the clamping force of the mounting bolts to be so high due to interference that the clutch is unable to be installed.

The inside of the bracket is torsionally connected to the pressure plate by a series of geometrically spaced spring straps. The spring straps have one end pivotably connected with the pressure plate along an outer periphery of the pressure plate. An opposite end of the spring straps is pivotally connected along the inner side of the bracket main body by rivets. To allow for installation of the rivets of the spring straps that connects the pressure plate with the brackets, the bracket side walls have cut outs to allow for tooling access.

It is desirable to positively limit the distance that the pressure plate can move toward the fly wheel to prevent damage to the flywheel from rivets in over worn friction discs. Prior to the current invention, two main methods were used to provide the positive stop. One method was to connect the pressure plate to the main body of the bracket by extending bolts which acted like guide rails with a stop at the end. This method worked, but the force exerted on the bolts by the pressure plate (by virtue of the clutch actuating spring(s) caused the bracket axially extending side walls to warp, especially in the area adjacent to the cut outs provided for tooling access. Another method to limit axial movement of the pressure plate with respect to the bracket is to provide an outer radial rim (similar to that of a brim on a hat) connected to the side wall of the bracket. A lug is then provided on the pressure plate which radially extends outside of the tooling access cut out. The pressure plate lug has a bend to then be seated against the bracket outer radial rim. This design also causes unfavorable warping of the side wall since the portion of the sidewall closest to the tooling access cut out is structurally weakest portion of the bracket sidewall.

It is desirable to provide a positive stop for delivering axial traveled the pressure plate with respect to the bracket which provides less deformation in the geometry of the bracket side walls when the pressure plate is fully loading a stop that prevents axial travel of the pressure plate with respect to the bracket.

SUMMARY OF THE INVENTION

To fulfill the above noted and other manifold desires, a revelation of the present invention is brought forth. In a preferred embodiment, the present invention brings forth a dry friction clutch for connecting a transmission with a flywheel of an engine. A bracket is provided having a main body axially spaced from the flywheel and is torsionally connected thereto. The bracket has a generally U-shaped cross section with a main body connected with generally axially extending side walls. An axially movable pressure plate is torsionally connected with the bracket. The pressure plate is axially movable within the bracket and is pivotally connected with the bracket by a plurality of spring straps. A friction disc is provided for having torsional connection with an input shaft of a transmission. The friction disc is axially positioned between the heel and the pressure plate. A release assembly is provided including a spring for urging the pressure plate toward the flywheel. The bracket side walls have a plurality of inward positioned barbs to axially limit the axial travel of the pressure plate with respect to the bracket.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
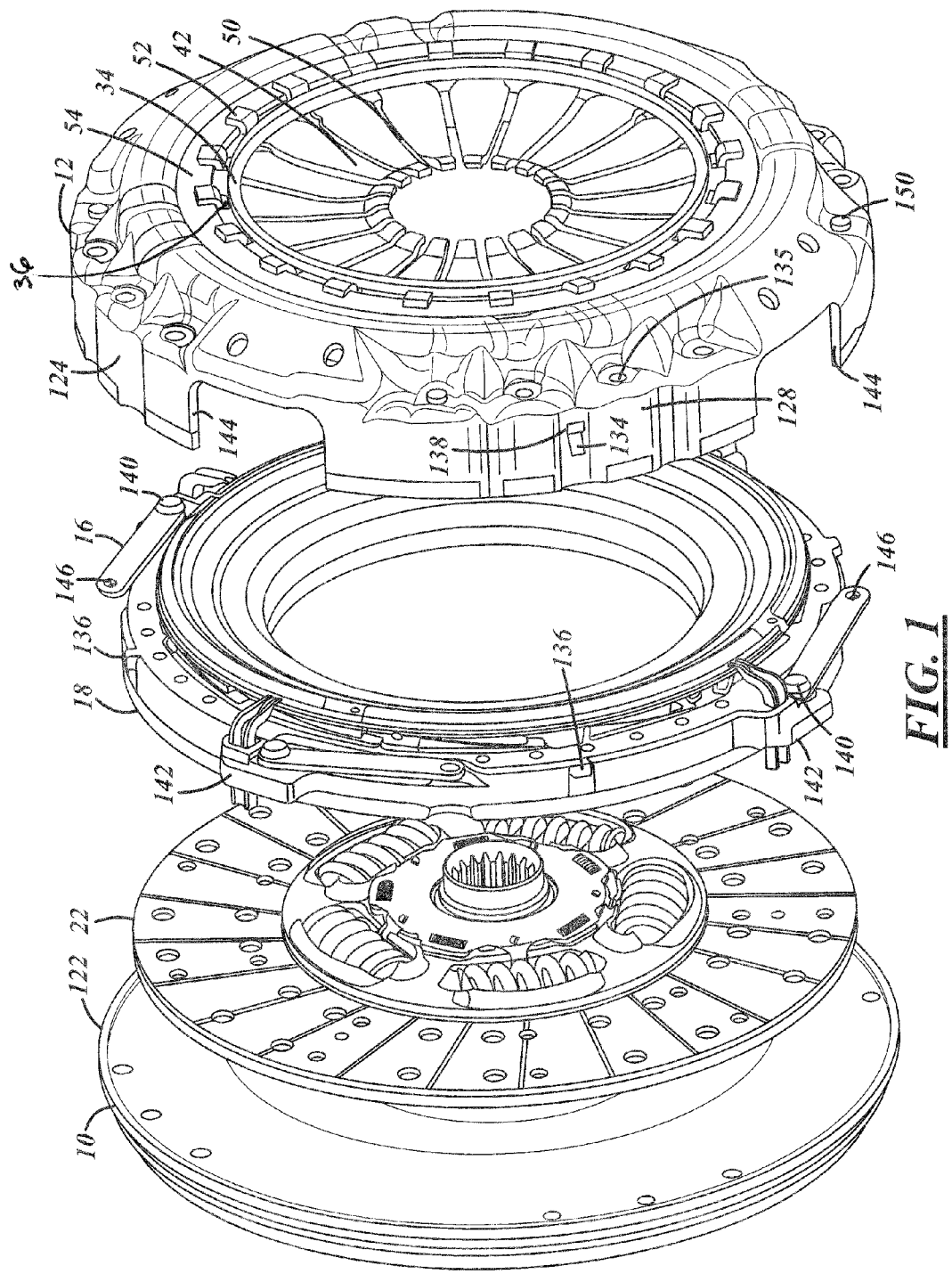
FIG. 1 is an exploded view of a dry friction clutch according to the present invention.

The following description of the preferred embodiment(s) is merely exemplary in nature and is in no way intended to limit the invention, its application, or uses.

Referring to FIGS. 1-7, a selectively engagable dry friction clutch assembly 7 is provided. The clutch assembly 7 selectively connects an input shaft of a transmission (not shown) with a flywheel 10 of an engine (not shown). The clutch assembly 7 includes a cover or bracket 12. The bracket 12 is typically a steel forging or stamping and is generally U-shape with a central opening 13. The cover 12 has a main body 14 that is axially spaced from the flywheel 10 and is torsionally connected thereto by a series of bolts (not shown). Torsionally connected to the bracket 12 by spring straps 16 is a pressure plate 18. The pressure plate 18 has a lower flat annular surface 20 for engagement with a friction disc 22. On a side generally opposite surface 20, the pressure plate 18 has an annular groove 24. The annular groove 24 has a radially inner wall 26. Projecting axially from the annular groove 24 is a roll pin 28. An outer perimeter of the annular groove 24 is formed by multiple ramps 30 which combine to provide an integral first cam ring 32. The first cam ring 32, if desired, can be a separate ring fixed to the pressure plate.

As mentioned previously, the cover 12 has an inner opening which is bordered by a lip 34. Adjacent to the lip 34 is a series of holes 36. Positioned inside of the cover 12 is a clamping member or diaphragm spring 38. Diaphragm spring 38 is a disc-shaped Belleville spring having a continuous solid outer rim portion 40. Projecting radially inward from the rim 40 is a series of leaves 42.

Holding the diaphragm spring 38 in position is a lower fulcrum ring 44. The lower fulcrum ring 44 typically is produced from steel and has an annular portion formed into a point to contact the diaphragm spring 38. The lower fulcrum 44 has a series of arms or C-frames 46. The C-frames 46 extend upwardly through diaphragm spring slot enlargements 48 that are at a base of radial slots 50 which separate the spring leaves 42. The C-frames 46 also extend through holes 36 of the bracket. The ends of the C-frame 46 form tabs 52. Tabs 52 are tensioned by a Bellville washer preload spring 54. The preload spring 54 effectively causes the C-frame tabs 52 to be pushed upward causing the ring portion of the lower fulcrum 44 to load the diaphragm spring 38 and also hold it in position. The rim 40 of the diaphragm spring 38 pushes downward on the pressure plate 18 (via an adjustment assembly 60 to be described later). The pressure plate 18 is axially movable with respect to the bracket 12. The clamping movement of the pressure plate 18 is induced by the clamping load of the diaphragm spring 38 causing the pressure plate 18 to engage with a friction disc 22. The friction disc (which is axially movable upon the transmission input shaft) are engaged frictionally with the flywheel 10 to torsionally connect the engine with the input shaft of the transmission. In the normal state of operation, the clutch assembly 7 engages the transmission with the engine unless the clutch is released.

To torsionally disconnect the transmission from the engine, a shift fork (not shown) contacts an inner portion of the leaves 42 causing the diaphragm spring 38 to elastically deform causing its outer rim portion 40 to pivot about the lower fulcrum 44 causing its outer radial edge to pivot away from the pressure plate 18 to allow the pressure plate 18 to disengage from the friction disc 22, thereby allowing the transmission input shaft to be disengaged from the engine.

Juxtaposed between the pressure plate 18 and the diaphragm spring 38 is an adjustment assembly 60. The adjustment assembly is provided to allow the clutch to compensate for wear of the friction disc 22. The adjustment assembly 60 includes the aforementioned first cam ring 32. Engaged with the first cam 32 is a second cam ring 62. The second cam ring 62 has a tip 64 to transfer the clamping load provided by the diaphragm spring 38 to the pressure plate 18. A bottom portion of the second cam ring 62 has a series of ramps 66 for engagement with the first cam ring 32. Relative rotation of the second cam ring 62 with respect to the first cam ring 32 causes an increase in the effective distance between the diaphragm spring 38 and the surface 20 of the pressure plate to compensate for wear reducing thickness of the friction disc 22.

Figure 5:
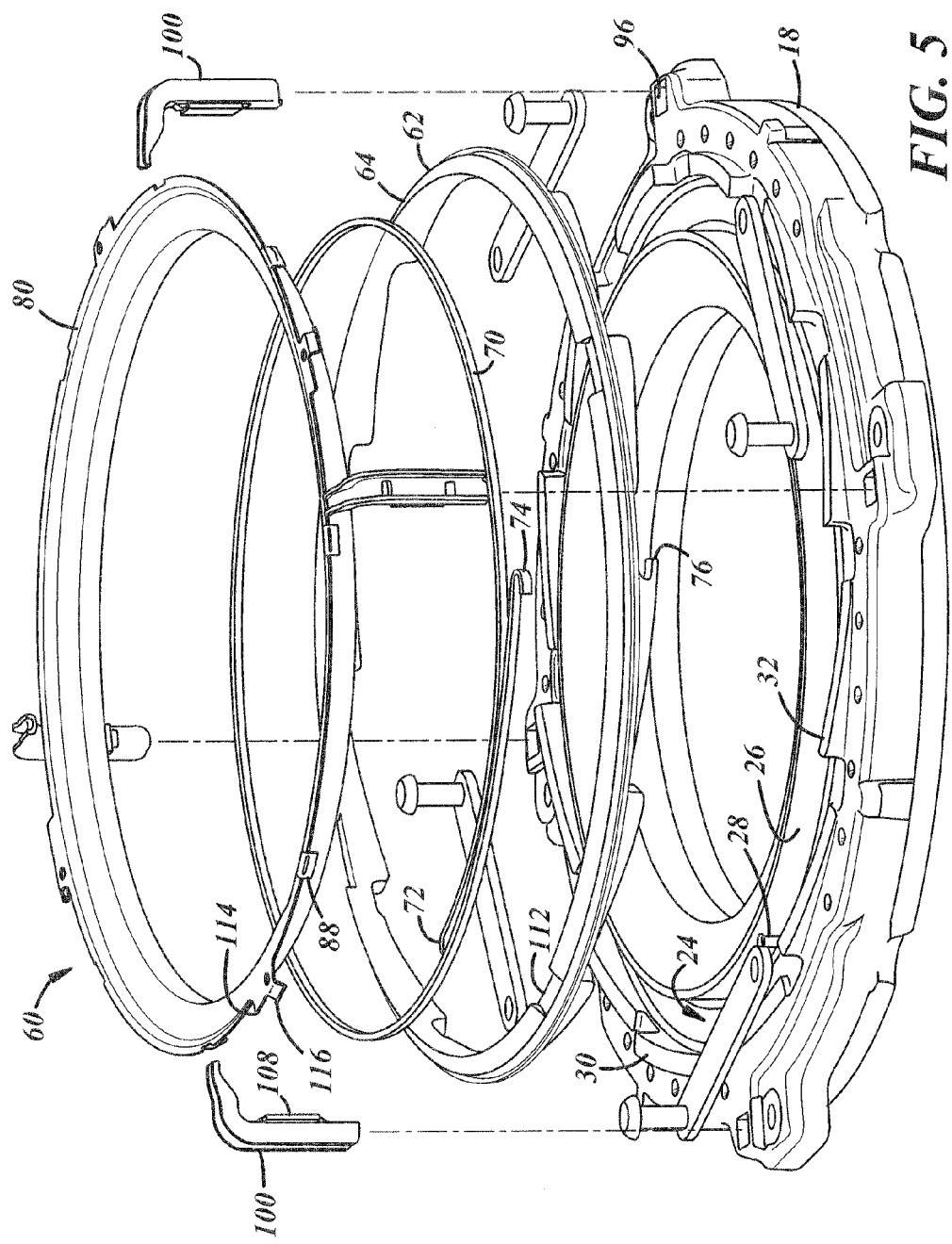
FIG. 5 is an exploded view of the adjustment mechanism of the clutch illustrated in FIG. 1.
Figure 6:
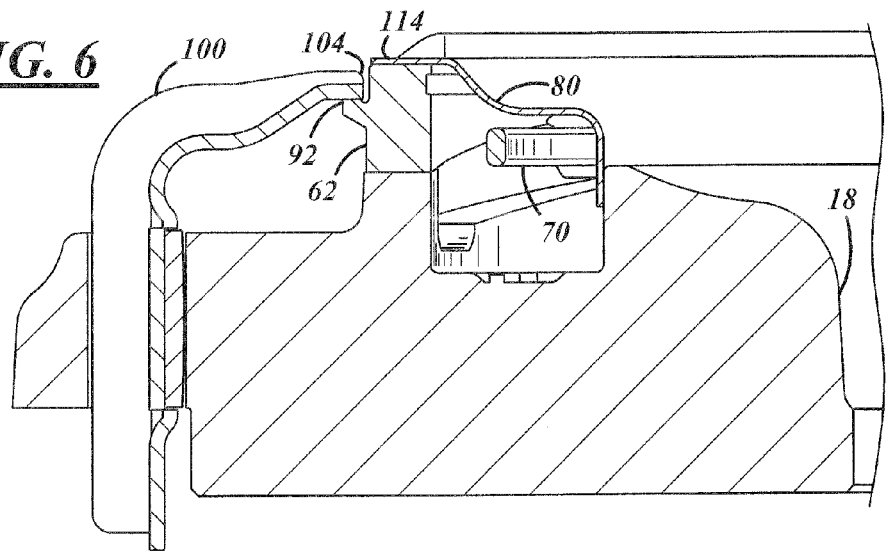
FIG. 6 is a view similar to that of FIGS. 2 and 3 with some components of the clutch deleted for clarity of illustration illustrating the adjustment mechanism at its limit of adjustment.
Figure 10:
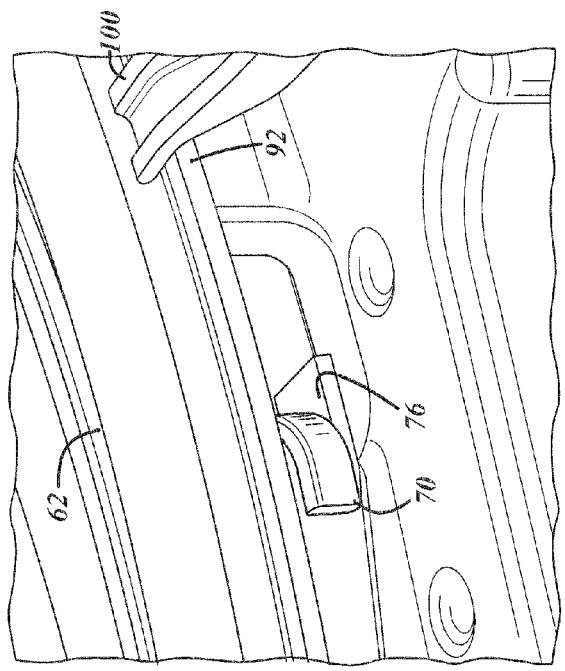
FIG. 10 is a partial perspective view illustrating a connection of the torsional spring with a second cam ring.
Figure 9:
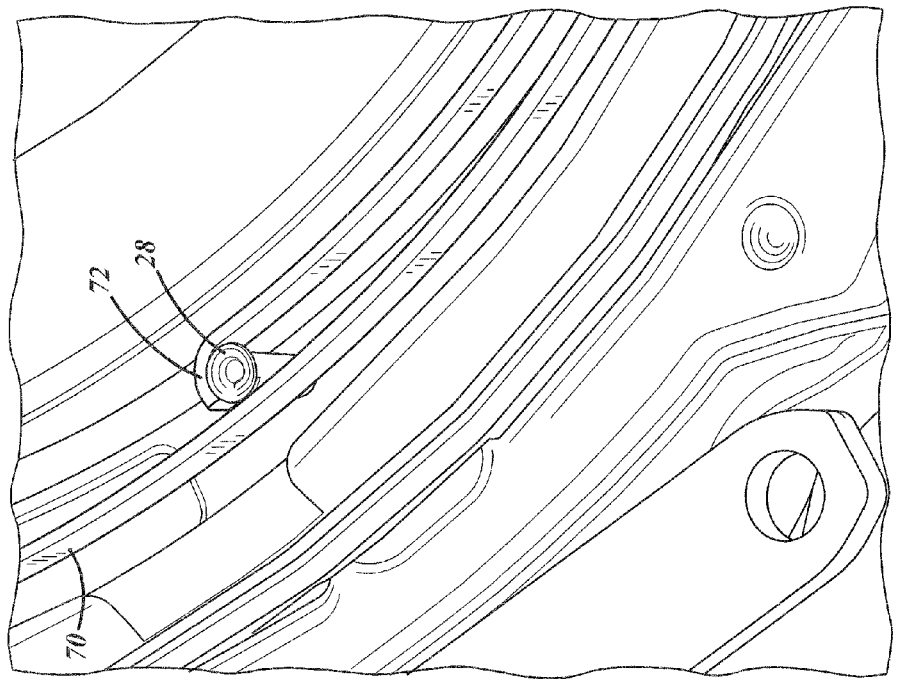
FIG. 9 is a partial perspective view illustrating connection of a torsional spring connected with a pin that is connected to the pressure plate.

To urge the second cam ring 62 to have relative rotation with respect to the first cam ring 32, there is provided a torsion spring 70. The torsion spring 70 at one extreme end has an eyelet 72 that encircles roll pin 28 (FIGS. 5 and 9). An opposite extreme end of torsion spring 70 has an eyelet 74 which hooks into a slot 76 provided in the second cam ring (FIGS. 5 and 10). Torsional spring 70 seeks to straighten out from its wound position within the annular groove 24 of the pressure plate 18 thereby causing the second cam ring 62 to rotate with respect to the first cam ring 32.

Figure 11:
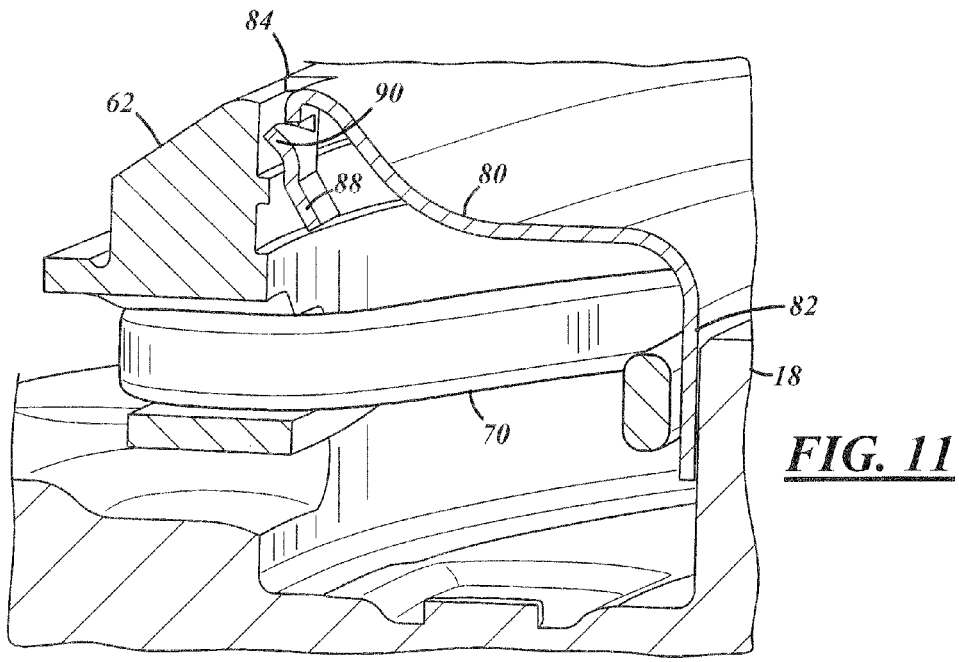
FIG. 11 is an enlarged partial sectional view illustrating an assembly operation of connecting a baffle with the second cam ring of the clutch of the present invention and the piloting of the second cam ring by virtue of the baffle.
Figure 12:
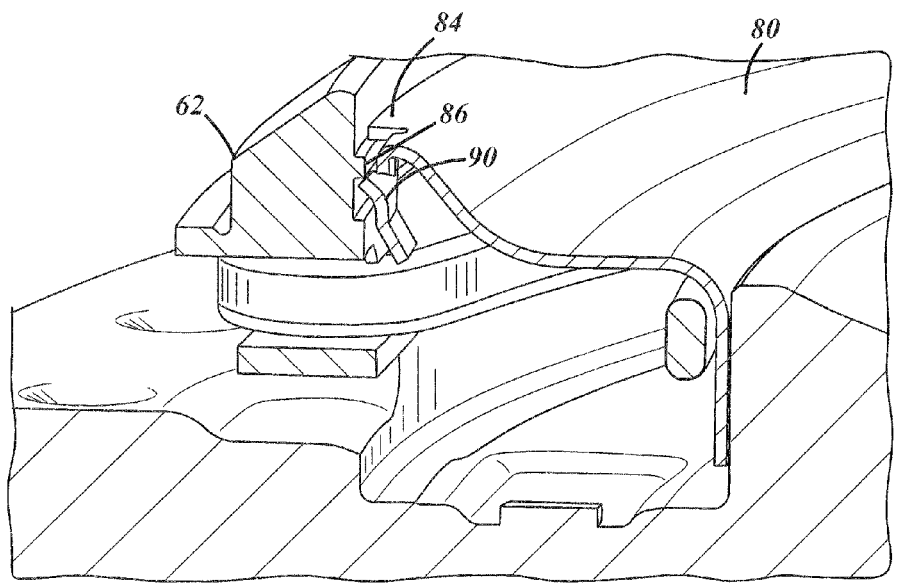
FIG. 12 is a view similar to that of FIG. 11 illustrating completion of the assembly of the baffle to the secondary cam ring.

Connected with the second cam ring 62 is a baffle 80. The baffle 80 environmentally protects torsion spring 70 from dirt and other debris. The baffle 80 has a generally axially orientated inner radial wall 82. The inner radial wall 82 is positioned generally adjacent to the radially inner wall 26 of the pressure plate annular groove 24 and is piloted by the same. The baffle 80 is typically a stamping. The baffle 80 has a main radial edge 84 that when placed in position, rests upon a middle radial step 86 provided on an inner diameter of the second cam ring 62 (FIGS. 11 and 12). The baffle 80 has a downward stamped finger 88 with a punched out barb 90. When the baffle 80 is assembled to the second cam ring 62, the main radial edge rests upon the step 86 and the barb 90 elastically deforms to engage and snap under step 86 to give a snap fit arrangement which is extremely secure. A plurality barbs 90 geometrically spaced are typically utilized to allow the baffle 80 to be assembled to the second cam ring 62 without any special tooling while yet providing an extremely secure connection between the baffle 80 and second cam ring 62. Secondly, the positioning of the baffle inner radial wall 82 adjacent the radially inner wall 26 of the pressure plate annular groove 24 allows the radial positioning of the second cam ring 62 to be piloted to provide lateral stability between the second cam ring 62 and the first cam ring 32.

The second cam ring 62 along its outer periphery has a radial rim 92. The second cam ring 62 also has four radially extending slots 94.

The pressure plate 18 has a series of bores to allow for attachment by spring straps 16 with the bracket 12. By virtue of the flexibility of the spring straps 16, pressure plate 18 can move axially with respect to the bracket 12. Additionally, the pressure plate 18 has a series of generally rectangular through apertures 96. Positioned within the apertures 96 are control fingers 100. Control fingers 100 are typically provided by a copper coated stamp steel member having stamped out tabs 102. A bottom extreme end 104 is provided for contact with the engine flywheel 10. The control finger 100 has a perpendicular extending extreme end 106. The control finger 100 is positionally inserted within the rectangular aperture 96 of the pressure plate 18 with the extreme end 106 pointed radially inwardly. A leaf spring 108 is positioned between the tabs 102 and upon insertion into the rectangular aperture 96, expands outwardly to frictionally capture the control finger 100 with the pressure plate 18. Typical forces may vary per application, but typical loads of retention to retain the control finger 100 in its position are approximately five hundred pounds force. The extreme end 106 is positioned adjacent to the radial rim 92 of the second cam ring 62. The control finger will prevent rotation of the second cam ring 62 with respect to the first cam ring 32 unless adjustment is appropriate.

Diaphragm spring 38 acts as a clamping member loading point 64 of second cam ring which in turn forces downwardly upon the first cam ring 32 integral with the pressure plate 18 to cause the pressure plate 18 to clamp downward (in an axial direction toward the engine flywheel) on the friction disc 22 against the flywheel 10 of the engine thereby torsionally connecting the engine with the transmission input shaft of a vehicle. To torsionally release the transmission from the engine, a push type shift fork (not shown) is utilized to impart a force via a release bearing (not shown) to push the leaves 42 of the diaphragm spring 38 towards the pressure plate 18 causing the rim 40 of the diaphragm spring to pivot about the lower fulcrum 46 causing the radial edge 41 of the diaphragm spring 38 to pivot away from the pressure plate 18 to allow the clutch 7 to release. A pull back of the shift fork relieves the leaves 42 allowing the diaphragm spring 38 to re-engage with the point 64 of the second cam ring thereby torsionally reconnecting the transmission with the engine. If the friction pads of the friction disc 22 are not sufficiently worn, no adjustment can occur due to the fact that the control fingers 100 engagement with second cam ring 62 radial rim 92 will prevent any adjustment. Upon sufficient wear of the friction disc 22 that adjustment is required, relative movement of the pressure plate with respect to the control fingers 100 will occur upon the control fingers 100 engagement with the flywheel 10 of the engine. An adjustment gap 110 is generated between the control finger and the radial rim 92. One feature of the control arms in their frictional engagement with the rectangular apertures is that relative movement of the control arms with respect to the pressure plate 18 will not occur due to vehicle engine or transmission vibrationary events, but will only occur when there has been wear of the friction discs 22 since the diaphragm spring 38 is the only thing that can apply sufficient force to force the adjustment gap between the control finger 100 and the radial rim 92 of the secondary cam ring 62. Upon the next release of the pressure plate 18 from the frictional disc 22, second cam ring 62 will now be free to rotate relative to the first cam ring 32 to raise the radial rim 92 until it is again limited by contact with the extreme end 106 of the control fingers 100. Thereby the effective distance between point 64 of the second cam ring and the surface 20 of the pressure plate 18 will be adjusted to compensate for a reduced thickness of the lining of the friction disc 22.

Figure 7:
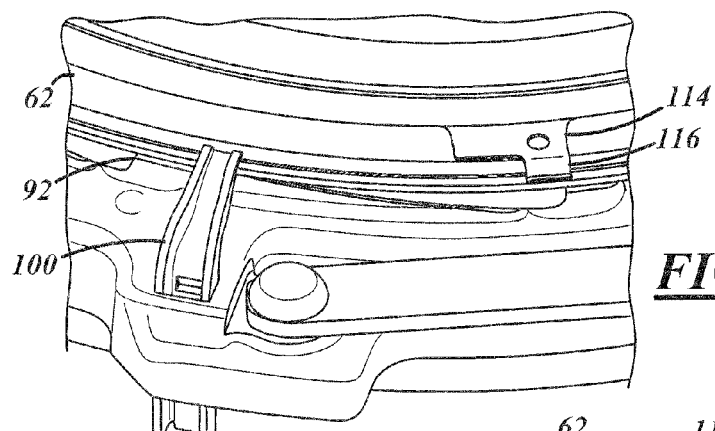
FIG. 7 is a partial side perspective view of the clutch shown in FIG. 2 when the friction lining is in essentially new condition.
Figure 8:
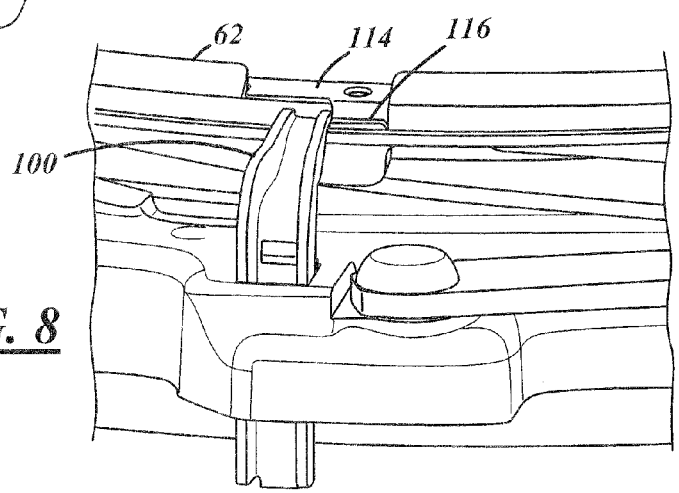
FIG. 8 is a view similar to that of FIG. 7 illustrating the clutch when it is at its end of adjustment.

It is often desirable to limit the maximum amount adjustment of the adjusting assembly 60. It is undesirable to allow the friction lining to be engaged when it is so thin that rivets holding the friction pad material to the underlying metal plate can then be exposed and cause damage to the flywheel 10. It is also desirable to limit relative rotation of the second cam ring 62 with respect to the first cam ring 32 such that the ramps 30 and 66 cannot go past each other causing the adjustment assembly 60 to return to its initial new friction disc position. The second cam ring 62 has a series of radial slots 112. Placed within the slots 112 of the second cam ring 62 are radially outward projecting tabs 114 of the baffle. The tabs 114 of the baffle 80 have a V-shaped cross-sectional extension 116. Tabs 114 are simply extensions of the main radial edge 84 of the baffle. Placement of the tabs 114 within secondary cam ring slots 112 also ensures the proper radial orientation of the baffle 80 with respect to the secondary cam ring 62. When the friction discs are new, radial slots 114 are angularly spaced away from the control fingers 100 (FIG. 7). As the secondary cam rotates during adjustment operation, it will rotate closer and closer to the control fingers 100. At the maximum state of desired adjustment, projection 116 contacts the control finger 100 thereby setting a limit of maximum adjustment of the adjustment assembly 60 (FIG. 8).

Figure 13:
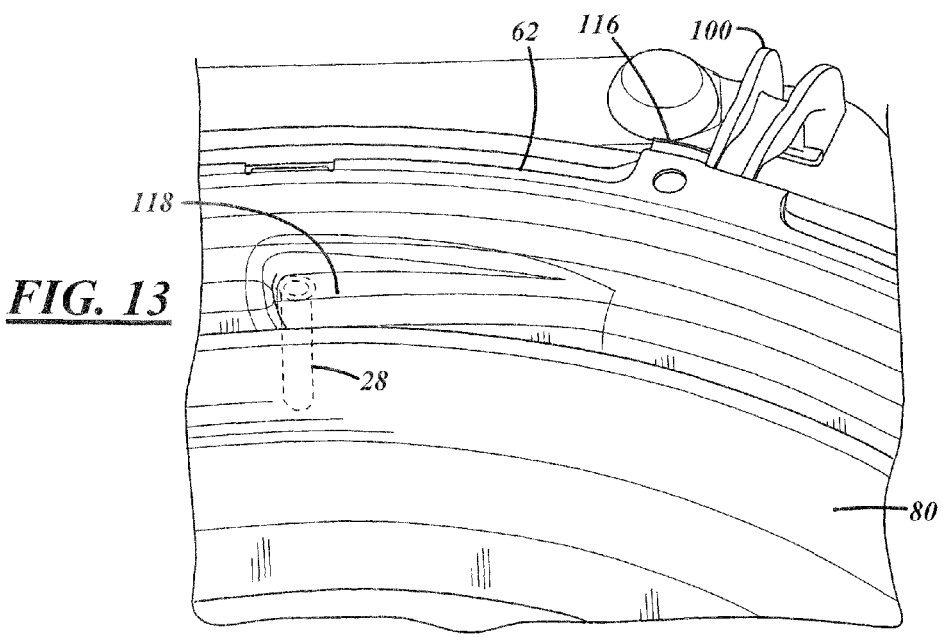
FIG. 13 is a partial perspective view illustrating utilization of a depression ramp of the baffle and preventing dislodgement of the torsional spring from the first cam ring and pressure plate.
Figure 14:
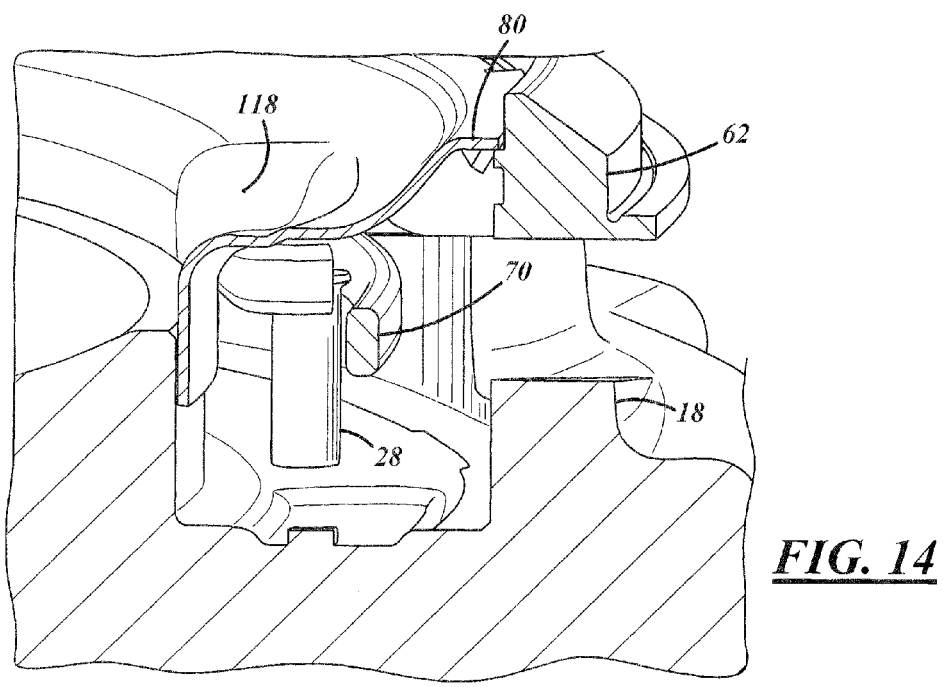
FIG. 14 is a sectional view of the portion of the clutch shown in FIG. 13.
Figure 16:
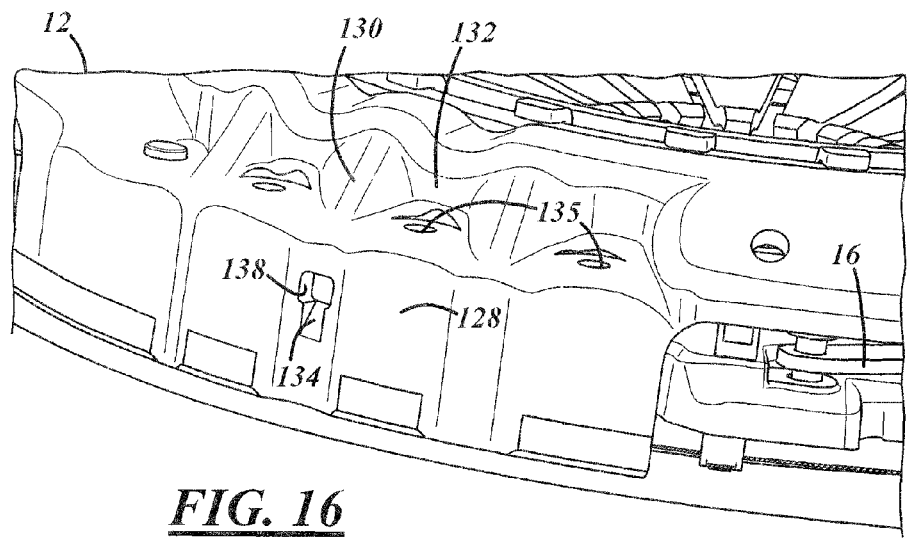
FIG. 16 is a perspective view of the bracket shown in FIG. 15.

Another feature of the baffle 80 is a ramp depression 118 (FIGS. 13 and 14) which is positioned adjacent to the roll pin 28. Ramp depression 118 is ramped axially downward toward the pressure plate annular groove 24 in an area adjacent to the roll pin 28. As the adjustment assembly reaches its state of maximum adjustment, the ramp depression 118 ensures that the axial space between the top of the roll pin 28 and the baffle 80 is less than the thickness of the torsional spring 70 in the axial direction to ensure that the eyelet of the torsion spring 70 cannot dislodge from the roll pin 28 (even though the second cam ring 62 is moving axially away from the first cam ring 32 during adjustment). The roll pin 28 has a head to prevent this, but the ramp depression 118 of the baffle ensures a secondary backup to prevent adjustment assembly malfunction due to torsional spring release.

A major advantage of utilizing a tab extension 116 on the baffle 80 to limit maximum adjustment is that applications which utilize different thicknesses of friction pad material, or customers who desire to limit adjustment to different amounts can be easily accommodated by simply adjusting the location of the tab projection 116 on the radially outward projecting tab 114 without having major re-design of the clutch or adjustment assembly.

Figure 17:
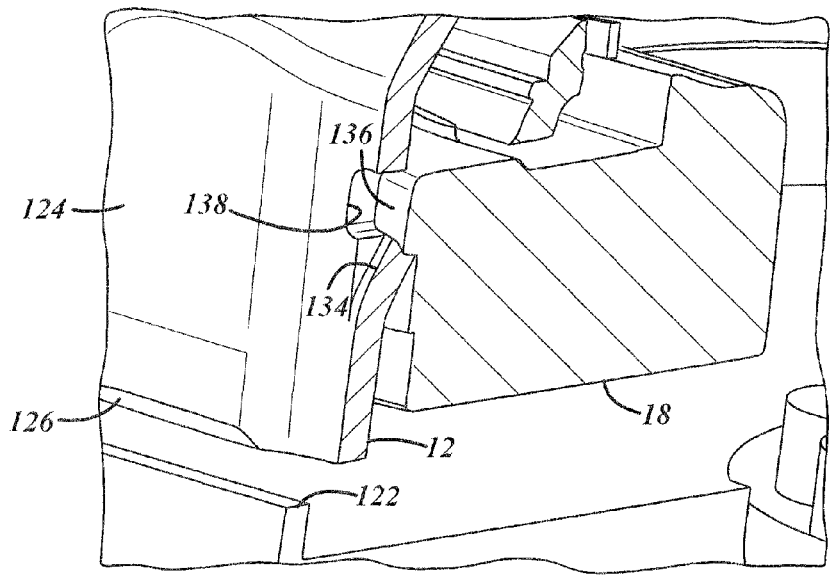
FIG. 17 is a sectional perspective view of the bracket pressure plate and flywheel associated with the clutch assembly of FIGS. 1-14.

As best shown in FIGS. 1 and 17, the engine flywheel 10 has a pilot rim 122. The rim 122 aids in providing alignment between the bracket 12 and the engine flywheel 10. The bracket 12 has a main body 14. Joined to the main body 14 of the bracket 12 is a generally axially extending side wall 124. The side wall 124 has a bevel edge 126 to pilot its insertion into the rim 122 during assembly of a clutch to the vehicle. The side wall 124 has ribs 128. The ribs 128 are arcuately alternate with support ribs 130 and a transitional area 132 of the main body. Between the support ribs 130 are mounting holes 135 which are provided for fasteners which fixably connect the bracket 12 with the engine flywheel 10. In line with the ribs 130 is a punched out barb 134. The barb 134 projects toward the main body 14. The barb 134 is integral with the side wall 124 and is positioned between two ribs 128 of the axially extending side wall 124. A plurality of barbs 134 supports the pressure plate 18 in compression by interaction with minor lugs 136 provided on the periphery of the pressure plate 18. A lug accommodating hole 138 is provided above the barb 134.

Figure 2:
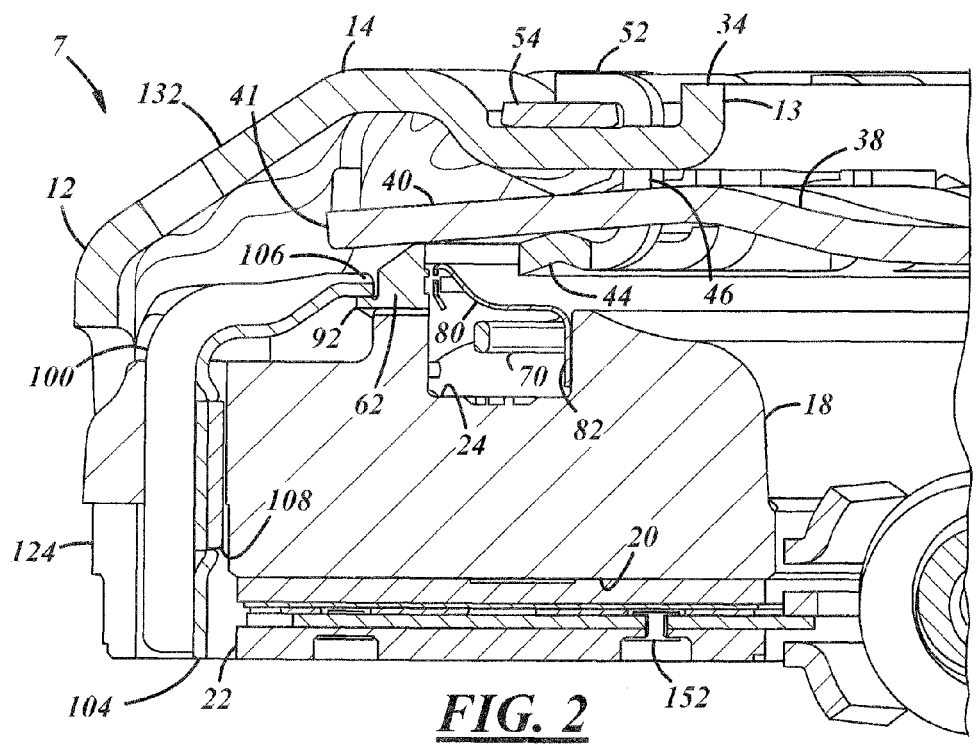
FIG. 2 is a partial sectional view of the clutch shown in FIG. 1.
Figure 15:
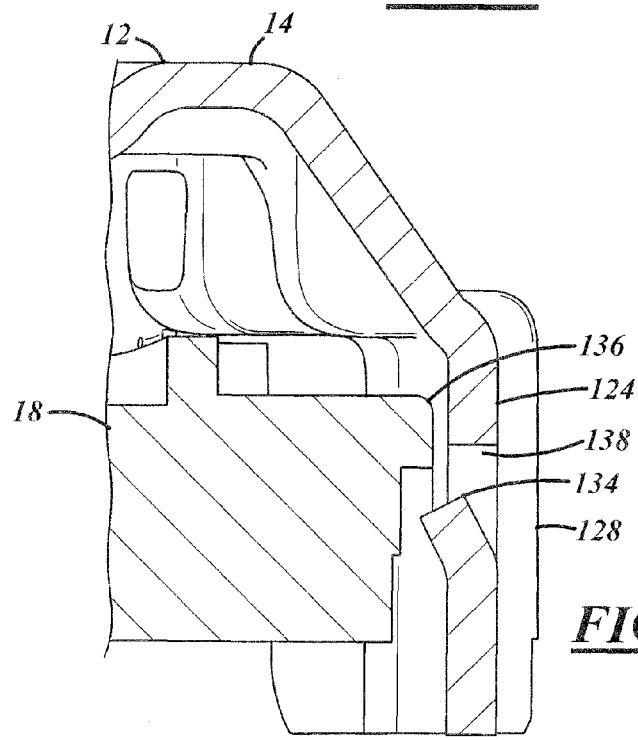
FIG. 15 is a sectional view of a bracket and inventive barb according to the present invention of the clutch assembly shown in FIGS. 1-14.
Figure 3:
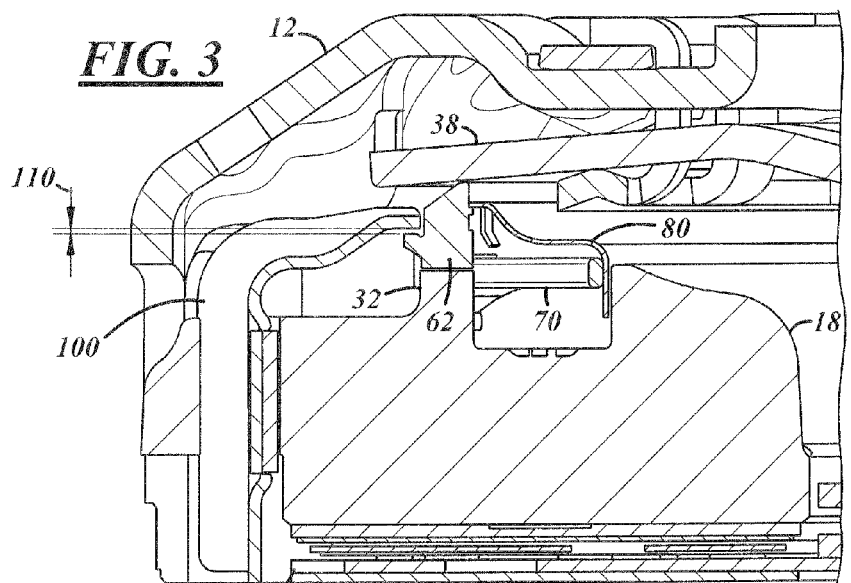
FIG. 3 is a view similar to that of FIG. 2 illustrating the clutch when there is need of adjustment due to wear of the friction disc utilized by the clutch.
Figure 4:
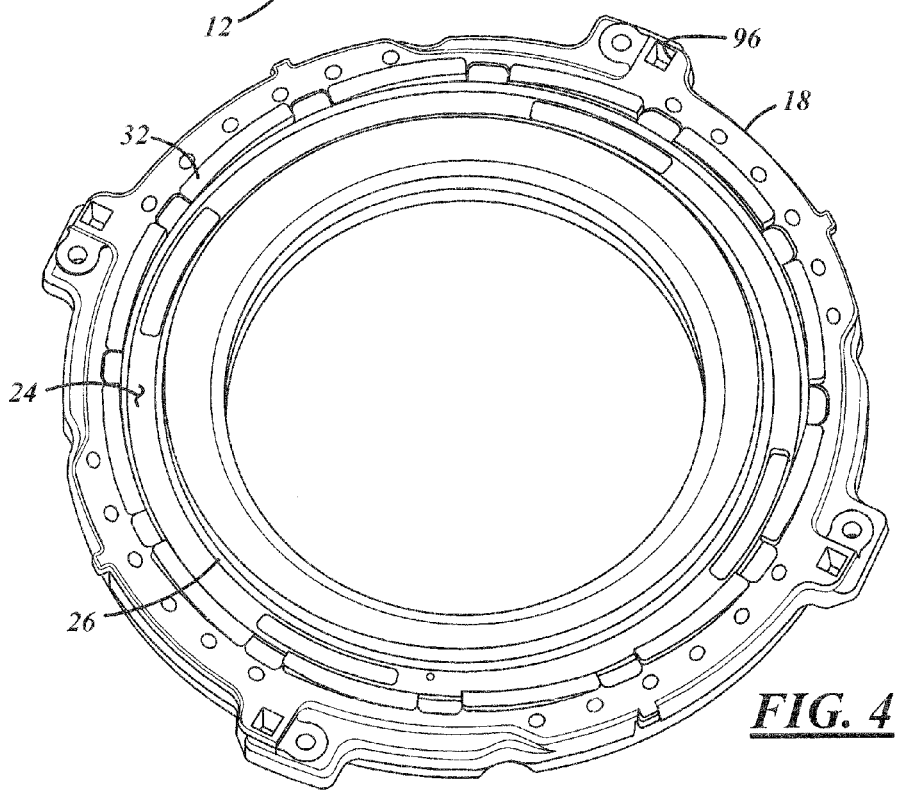
FIG. 4 is a perspective view of a pressure plate utilized in the clutch illustrated in FIG. 1.
Figure 18:
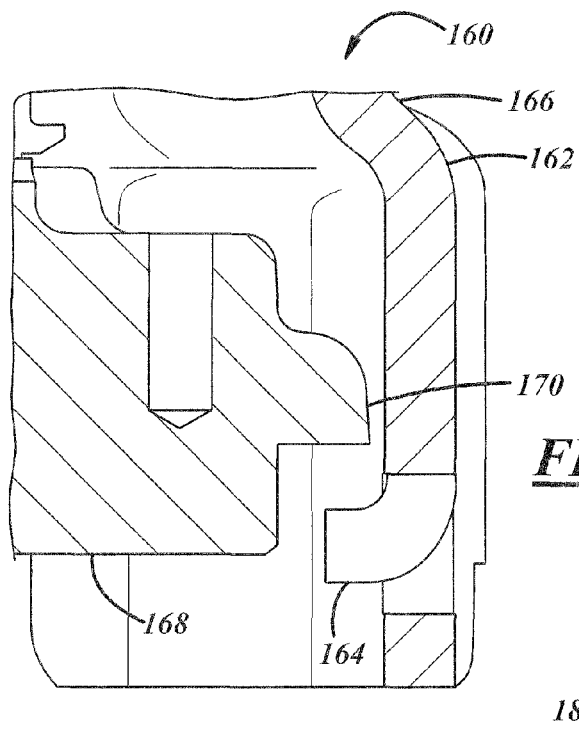
FIG. 18 is an alternate preferred embodiment bracket, barb and pressure plate assembly to that shown in FIGS. 15-17.
Figure 19:
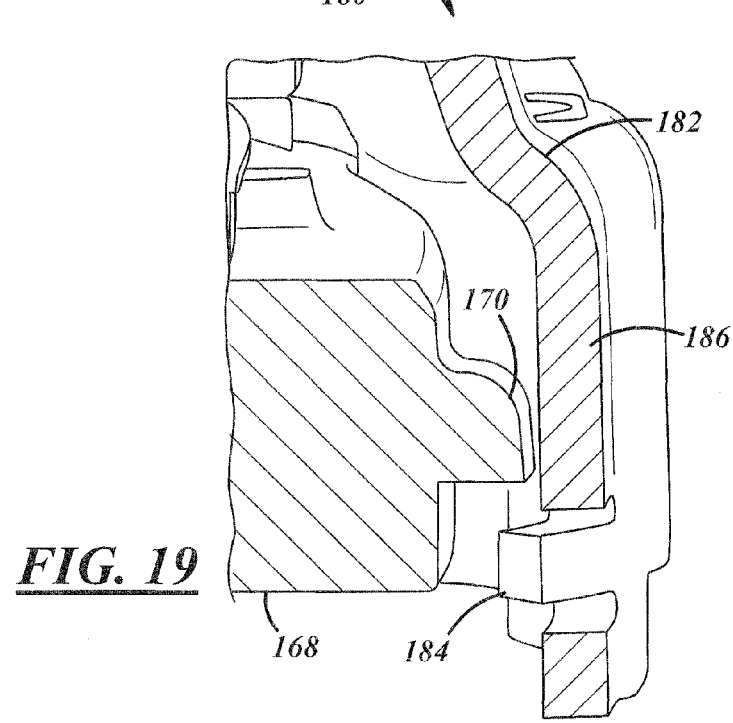
FIG. 19 is another alternate preferred embodiment bracket, barb and pressure plate to that shown in FIGS. 13-17.

In assembly the pressure plate 18 has pivotably connected thereto the spring strap 16 pivoting about a fastener 140. The fastener 140 is connected with a major lug 142 of the pressure plate. The pressure plate is then inserted within the bowl of the bracket 12. The minor lugs 136 have a snap fit engagement with the barbs 134 causing the barbs to be deformed radially outward and then snap back as the minor lug 136 passes through the barb. The bracket 12 has in its sidewalls 124 access cut outs 144 to allow tooling access to a remote hole 146 to allow the opposite end of the spring strap 16 to be pivotably connected with the bracket by a rivet 150 (only the head showing). The punched out barbs 134 become a directly contacting positive stop limiting axial displacement of the pressure plate 18 towards the flywheel 10. Accordingly, potential damage to the flywheel by engagement with a rivet 152 (as best shown in FIG. 2) of an over worn friction disc 22 cannot occur. Additionally, limiting the maximum axial travel to pressure plate prevents the pressure plate 18 from over stressing the spring strap 16. Therefore, upon full wear of the pressure plate 22, the pressure plate 18 can still be under the force of the diaphragm spring 38. The lug accommodating holes 138 allow for greater degree of concentric misalignment between the pressure plate 18 and the bracket 12 during operation or assembly. Warping of the bracket side wall 124 is greatly inhibited due to the fact that the barb 134 is between the axial ribs 128 of the side wall and is also in line with the support ribs 130 between the mounting holes 135. Referring to FIG. 18, an alternate preferred embodiment 160 of the present invention is provided. In the clutch 160, the bracket 162 has a punched out barb 164 that projects downwardly away from its main body 166. The pressure plate 168 has a mini lug 170 which is limited by the barb 164. Installation of the pressure plate 168 requires that the pressure plate be twisted such that the minor lug 170 can slide past the barb 164 and is then twisted in position so that it may be limited in its axial movement toward the flywheel. Clutch 180 has a bracket 182 having a barb 184 that projects generally perpendicular to the side wall 186. Again in the manner as previously described, the pressure plate 168 must be turned to allow passage of the minor lug 170 past the barb 184 during installation and the return to allow the lug 184 to serve as an axial stop for the pressure plate 168.

Although the current invention has been illustrated in clutches having diaphragm spring clamp members, the current invention can also be utilized in clutches having coil spring-lever release mechanisms wherein the levers act as clamp members.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A selectively engagable dry friction clutch assembly for connecting a transmission with a flywheel of an engine comprising:
    a bracket having a main body axially spaced from said flywheel and being torsionally connected thereto, said bracket having a generally U-shaped cross section with said main body being connected with generally axially extending side walls;
    an axially movable pressure plate torsionally connected with said bracket;
    a friction disc for torsional connection with an input shaft of a transmission, said friction disc being axially positioned between said flywheel and said pressure plate;
    a release assembly including a spring for urging said pressure plate toward said flywheel; and
    wherein said bracket side walls have a plurality of integrally formed radially inward barbs to limit axial travel of said pressure plate toward said friction disc by direct contact of said pressure plate with said barbs.

2. The dry friction clutch assembly of claim 1 wherein said barbs project toward said bracket main body.

3. The dry friction clutch assembly of claim 1 wherein said barbs project away from said bracket main body.

4. The dry friction clutch assembly of claim 1 wherein said barbs project perpendicular to said side walls.

5. The dry friction clutch assembly of claim 1 wherein said barbs hold said pressure plate in compression.

6. The dry friction clutch assembly of claim 1 wherein said pressure plate have a snap fit relationship with said barbs.

7. The dry friction clutch assembly of claim 1 wherein said barbs are between axial ribs in said side walls of said bracket.

8. The dry friction clutch assembly of claim 1 wherein said barbs are aligned with a support rib between mounting bracket holes in said main body of said bracket.

9. A selectively engagable dry friction clutch assembly for connecting a transmission with a flywheel of an engine comprising:
    a bracket having a main body axially spaced from said flywheel and being torsionally connected thereto, said bracket having a generally U-shaped cross section with said main body being connected with generally axially extending side walls;
    an axially movable pressure plate torsionally connected with said bracket;
    a friction disc for torsional connection with an input shaft of a transmission, said friction disc being axially positioned between said flywheel and said pressure plate;
    a release assembly including a spring for urging said pressure plate toward said flywheel; and
    wherein said bracket side walls have a plurality of integrally formed radially inward barbs projecting toward said bracket main body to limit axial travel of said pressure plate toward said friction disc by direct contact of said pressure plate with said barbs, said barbs being loaded in compression when contacted by said pressure plate.

10. The dry friction clutch assembly of claim 9 wherein said pressure plate has a snap fit relationship with said barbs.

11. The dry friction clutch assembly of claim 9 wherein said barbs are between axial ribs in said side walls of said bracket.

12. The dry friction clutch assembly of claim 9 wherein said barbs are aligned with a support rib between mounting bracket holes in said main body of said bracket.

13. A selectively engagable dry friction clutch assembly for connecting a transmission with a flywheel of an engine comprising:
    a bracket having a main body axially spaced from said flywheel and being torsionally connected thereto, said bracket having a generally U-shaped cross section with said main body being connected with generally axially extending side walls, said main body having reinforcing support ribs between mounting holes, said side walls having reinforcing ribs;
    an axially movable pressure plate torsionally connected with said bracket, said pressure plate having minor lugs;
    a friction disc for torsional connection with an input shaft of a transmission, said friction disc being axially positioned between said flywheel and said pressure plate;
    a release assembly including a spring for urging said pressure plate toward said flywheel; and
    wherein said bracket side walls have a plurality of integral radially inward barbs projecting toward said bracket main body to limit axial travel of said pressure plate with respect to said bracket, said barbs having a snap fit relationship with said pressure plate minor lugs, and said barbs being positioned between ribs of said side walls and aligned with support ribs of said main body, said barbs being loaded in compression when contacted by said pressure plate.

* * * * *